United States Patent [19]

Spengler

[11] 4,106,379

[45] Aug. 15, 1978

[54] APPARATUS FOR TRIMMING THREE-DIMENSIONAL WORKPIECES

[75] Inventor: Ernst Maximilian Spengler, Heusenstamm, Germany

[73] Assignee: Stanztechnik GmbH R & S, Frankfurt, Germany

[21] Appl. No.: 809,921

[22] Filed: Jun. 24, 1977

[51] Int. Cl.² .................. B26D 5/12; B26D 5/42; B26D 7/02; B26D 11/00
[52] U.S. Cl. .................................. 83/171; 83/417; 83/418; 83/437; 83/454; 83/465; 83/466; 83/519; 83/544; 83/639; 83/914
[58] Field of Search ............... 83/914, 465, 513, 519, 83/701, 171, 417, 563, 529, 530, 648, 437, 544, 545, 454, 466.1, 418

[56] References Cited

U.S. PATENT DOCUMENTS

| | | | |
|---|---|---|---|
| 3,075,573 | 1/1963 | Piazze | 83/171 X |
| 3,108,349 | 10/1963 | Takacs | 83/437 |
| 3,227,022 | 1/1966 | Evans et al. | 83/529 |
| 3,491,639 | 1/1970 | Hale et al. | 83/513 X |
| 3,581,617 | 6/1971 | Lysobey | 83/563 X |
| 3,877,858 | 4/1975 | Smith | 83/544 X |
| 4,002,092 | 1/1977 | Smith et al. | 83/697 X |
| 4,017,012 | 4/1977 | Brock | 83/171 X |
| 4,051,754 | 10/1977 | Harcuba et al. | 83/171 X |

*Primary Examiner*—Frank T. Yost
*Attorney, Agent, or Firm*—W. G. Fasse; W. W. Roberts

[57] ABSTRACT

The present trimming apparatus is capable of trimming the margins of three-dimensional workpieces with the aid of strip steel knives which are driven, preferably by pneumatic piston cylinder means in any desired direction. The workpiece such as the dashboard of a car, is held on the outside thereof by a workpiece support which has such a shape and cut-outs that the strip steel knives may be moved through the workpiece support. A counter-holder presses the workpiece against the outer support. In this combination of elements the workpiece may be trimmed from any direction from its outer side inwardly. The trimming tools may be operable in sequence and may also be supported on a carriage which shuttles back and forth between a trimming station and a loading and unloading station. Power savings may be in the order of 90% as compared to the power requirements of conventional stamping tools.

22 Claims, 9 Drawing Figures

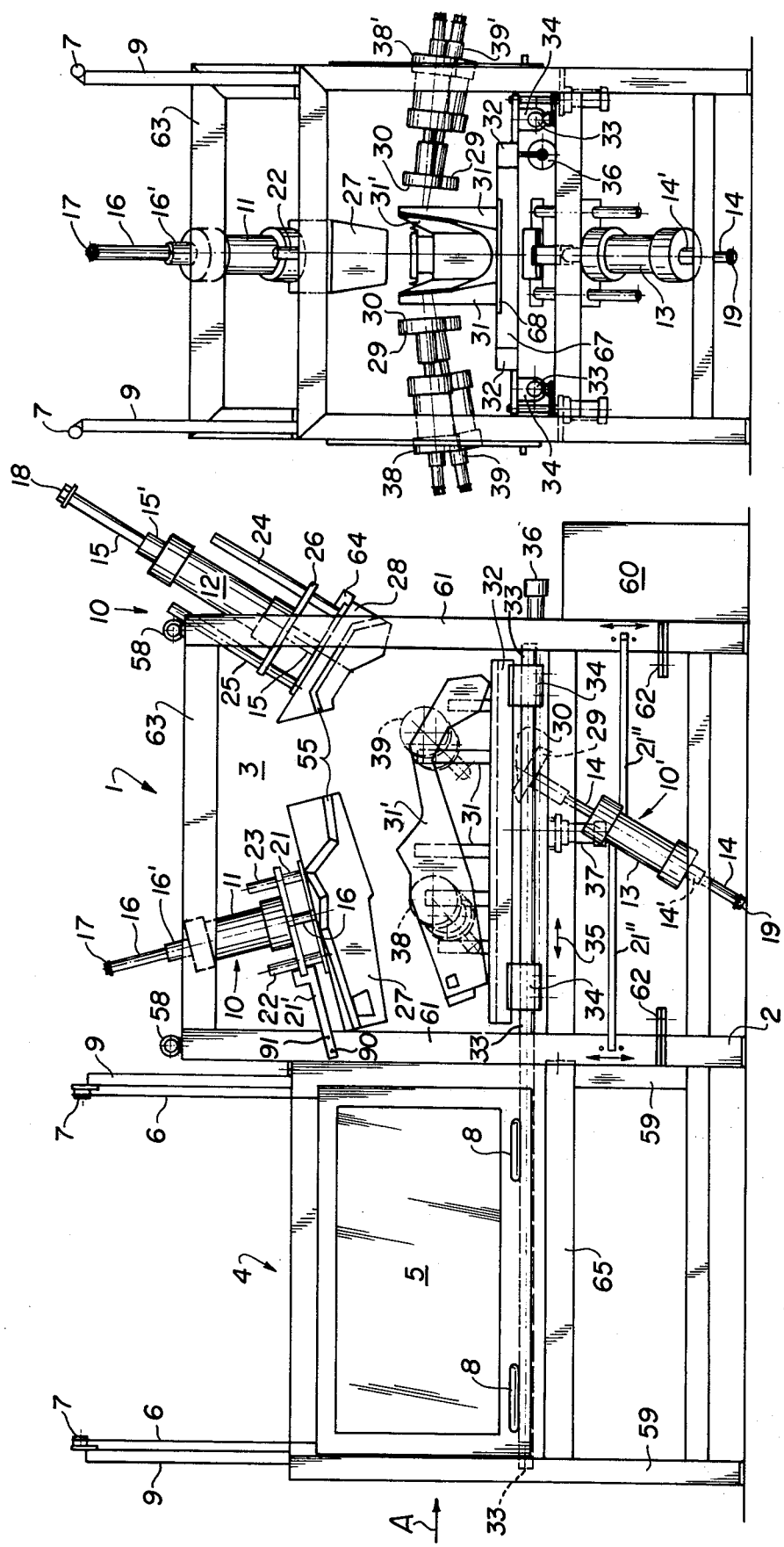

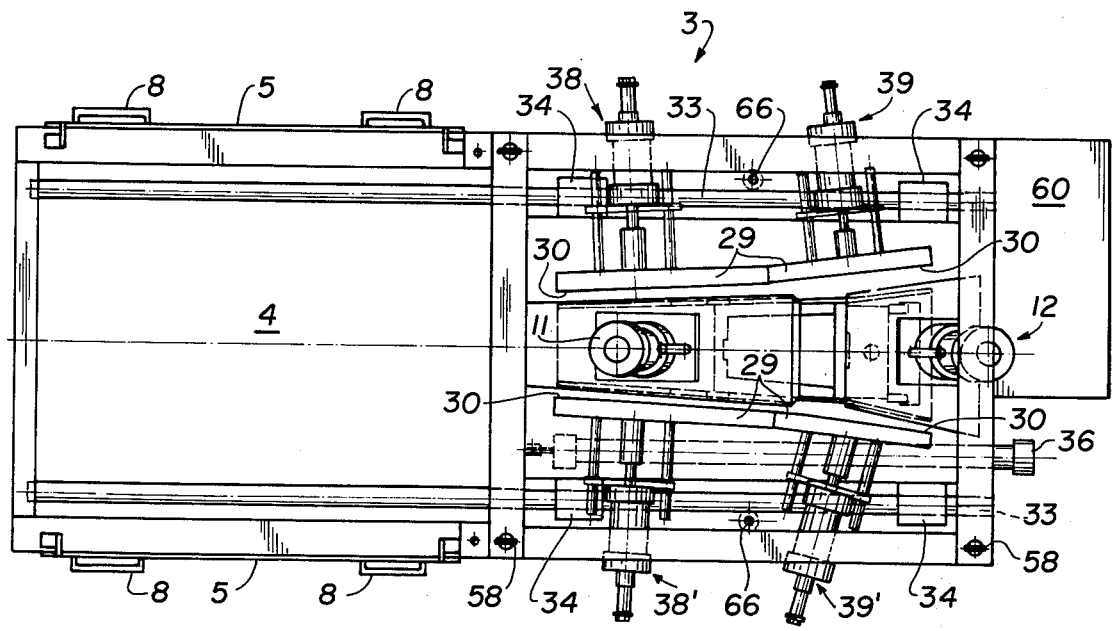
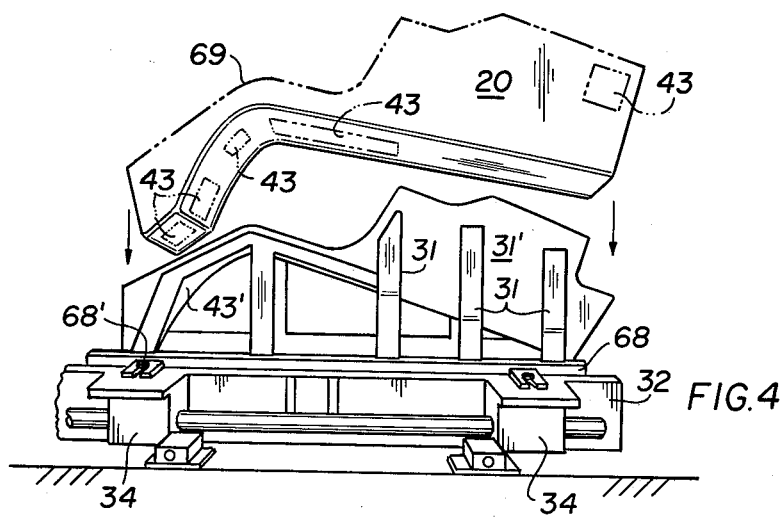
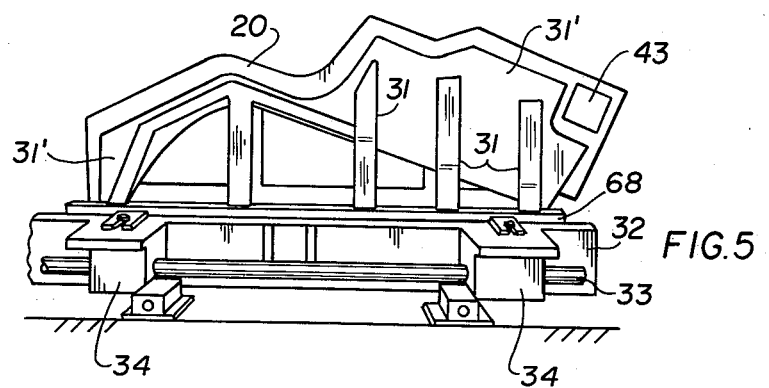

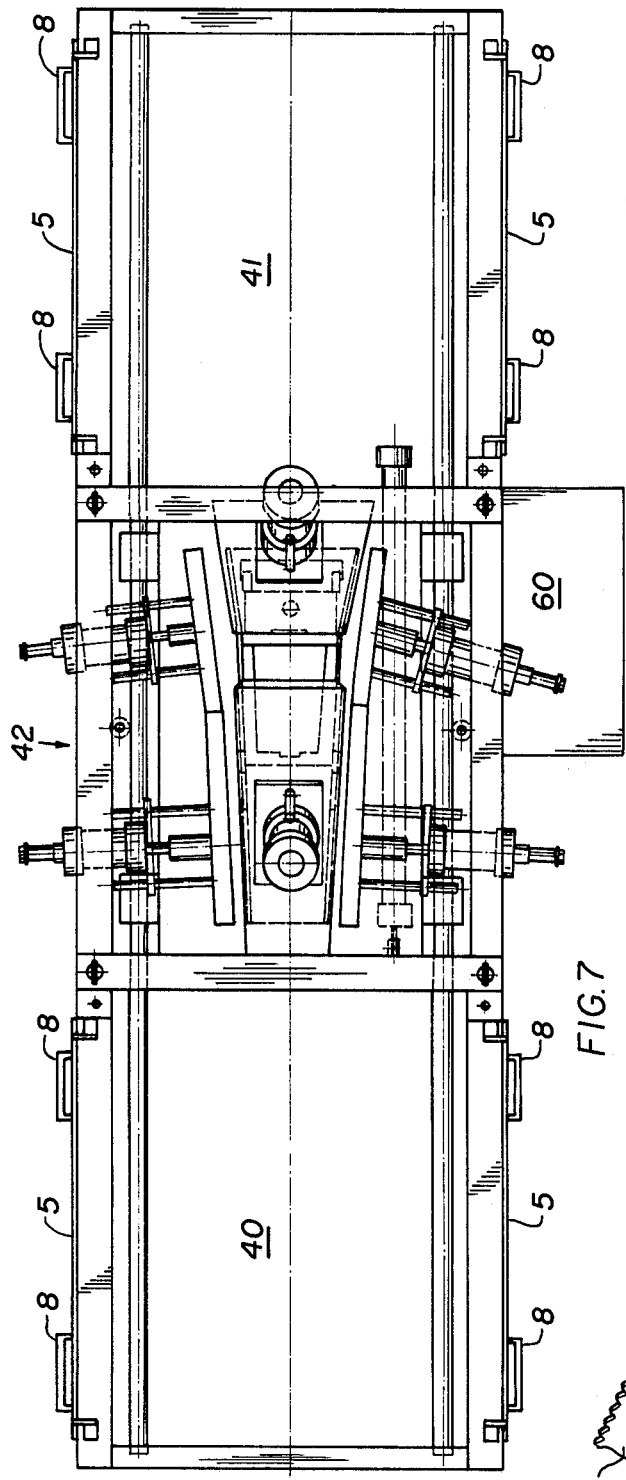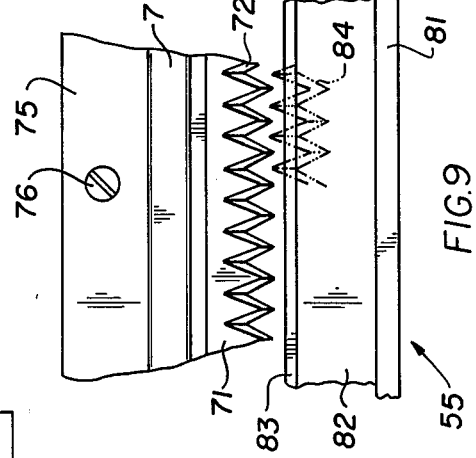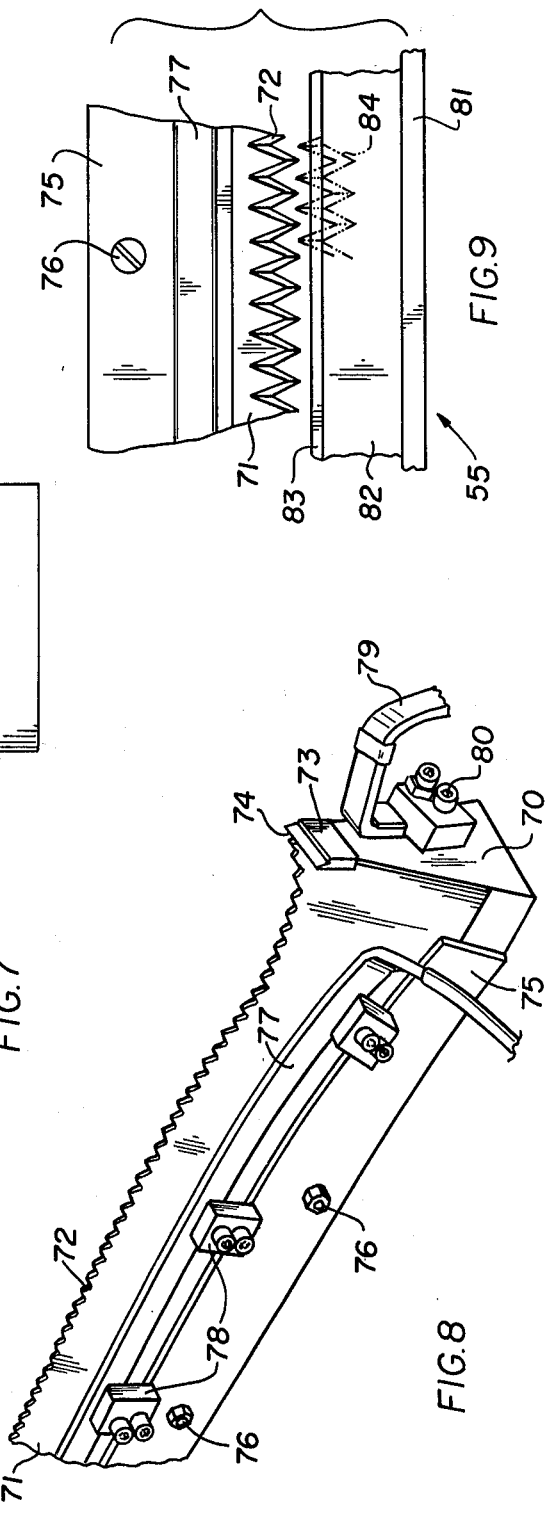

APPARATUS FOR TRIMMING THREE-DIMENSIONAL WORKPIECES

BACKGROUND OF THE INVENTION

The present invention relates to an apparatus for trimming three-dimensional workpieces. More specifically, the present apparatus relates to a machine which is capable of trimming workpieces having a rather complicated shape, such as dashboards, gear box housings, and the like.

German Patent Publication (DOS) No. 2,400,897 laid open to public inspection on July 17, 1975 discloses a trimming device in which the cutting elements are supported by a hinged holding device which in turn is secured to the frame structure of the apparatus. Due to the hinged support of the tool the versatility of the apparatus is somewhat limited. Further, the workpieces are supported from the inside thereof, whereby again, the movability of the tools in any desired direction is limited.

German Patent Publication No. 2,502,542 discloses a stamping apparatus employing strip steel knives and a counter-pressure plate which is made of elastical material to protect the cutting edges of the strip steel knife. Such knives may be employed in the apparatus of German Patent Publication No. 2,400,897 as well as in any other stamping apparatus such as, for example, the present trimming apparatus.

OBJECTS OF THE INVENTION

In view of the foregoing, it is the aim of the invention to achieve the following objects, singly or in combination:

to provide a trimming apparatus or cutting tool which is effective in the three dimensions of space, especially for trimming the margins of cover material along the edges of a randomly shaped workpiece, whereby the edges may define openings and/or recesses in such a workpiece;

to support a randomly shaped workpiece from the outside thereof in a uniform and repeatedly precise manner to assure a uniform precision trimming in any desired direction;

to provide a movable and adjustable counter-holder which may be positioned inside the workpiece whereby the workpiece is supported from the outside;

to construct the workpiece support means as well as the counter-holder in such a manner that only certain points of the workpieces are supported so that workpieces of many different sizes and shapes may be accommodated in one and the same apparatus;

to substantially reduce the pressure required for the operation of the trimming knives by heating the knives;

to trim a workpiece by means of several cutting knives which are operable either simultaneously or sequentially while maintaining the workpiece in one and the same position for all trimming operations from all sides;

to mount a workpiece supporting structure in a carriage which will permit the sequential loading and unloading of a workpiece without intereference by the trimming tools so that one workpiece may be in a trimming position or station while other workpieces are being loaded or unloaded;

to guide the trimming tool drive pistons in such a manner that the knive edges will always maintain precisely defined positions;

to provide means for adjusting the stroke depth of each individual knive carrying trimming tool piston so that the cutting depth may be precisely controlled;

to provide for the adjustability of the counter-holder means so that such counter-holder means may be adaptable to workpieces of various sizes and shapes;

to combine straight edged and serrated strip steel knives in one and the same cutting tool configuration;

to combine different strip steel knife sections in one and the same tool in such a manner that the knife edges of different sections extend to different levels;

to support the tools in such a manner that they may be moved out of the way of a shuttling workpiece support carriage; and to provide the counter-holder means with replaceable inserts which reduce the wear and tear on the trimming knife edges.

SUMMARY OF THE INVENTION

According to the invention there is provided an apparatus for trimming randomly shaped three-dimensional workpieces comprising frame means which hold workpiece support means mounted in the frame means so as to hold a workpiece on the outside thereof. Counter-holder mean are also mounted, preferably in an adjustable manner, in said frame means for holding the workpiece against the workpiece support means, preferably at selected points thereof. Tool carrier means are mounted in the frame structure and the tool carrier means support strip steel knife means which are power driven, preferably by pneumatically operated piston cylinder means connected to the tool carrier means for moving the strip steel knives toward and away from said workpiece from any desired direction. The strip steel knife means have a configuration corresponding to the edges of the workpieces, whereby such edges may run around, for example, the outer configuration of a car dashboard and around the openings as well as cutouts in such workpiece.

Preferably, the tool carriers are precisely guided so that the direction of movement of the strip steel knife carrying piston rod is precisely controlled and the piston stroke is adjustable.

In a preferred embodiment a trimming station and a loading and unloading station are combined so that a carriage for the workpiece support may be shuttled back and forth between these two stations. In a further preferred embodiment two loading and unloading stations are arranged to the right and left of a trimming station. This particular embodiment has the advantage that one workpiece support on a carriage may be in the trimming station while another workpiece support carriage is loaded or unloaded.

By heating the knife edges all along their configurations, it has become possible to substantially reduce the power requirements, for example, to only 10% as compared to conventional stamping tools so that more efficient pneumatic piston cylinder drive means may be employed instead of hydraulic drive means.

Further, the heating of the strip steel knife means may be controlled in the amount of heat applied as well as in the duration of heat application. Similarly, the application of pressure to the tool drive means may also be controlled in time sequence. Thus, for example, where a dashboard is covered by heat sensitive materials such as a thermoplastic sheet material, the application of heat may be reduced and the effective time of pressure application may be increased or this procedure may be reversed, depending on the type of material that must be trimmed.

BRIEF FIGURE DESCRIPTION:

In order that the invention may be clearly understood, it will now be described, by way of example, with reference to the accompanying drawings, wherein:

FIG. 1 is a somewhat schematic side view of an apparatus according to the invention, comprising a trimming station and a loading and unloading station and illustrating tool support means for the trimming of the margins of a drive shaft channel housing, whereby the workpiece support carriage is momentarily located in the trimming station;

FIG. 2 is a top plan view of the apparatus according to FIG. 1;

FIG. 3 is an end view of the apparatus of FIG. 1 as viewed in the direction of the arrow A shown in FIG. 1;

FIG. 4 illustrates a detail view of the loading and/or unloading of a drive shaft channel housing into the workpiece support;

FIG. 5 is a view similar to that of FIG. 4, but with the workpiece held on the outside thereof by the workpiece support structure in position for moving of the workpiece support carriage out of the trimming station after the trimming;

FIG. 7 is a top plan view of the apparatus shown in FIG. 6;

FIG. 8 is a three-dimensional view of a strip steel knife configuration having a serrated knife edge in combination with a straight knife edge portion as well as knife heating means; and FIG. 9 illustrates, on an enlarged scale, a partial view of a strip steel knife with a serrated edge and a padding device which may be part of the counter holder to protect the knife edge.

DETAILED DESCRIPTION OF PREFERRED EXAMPLE EMBODIMENTS

Figure 6:
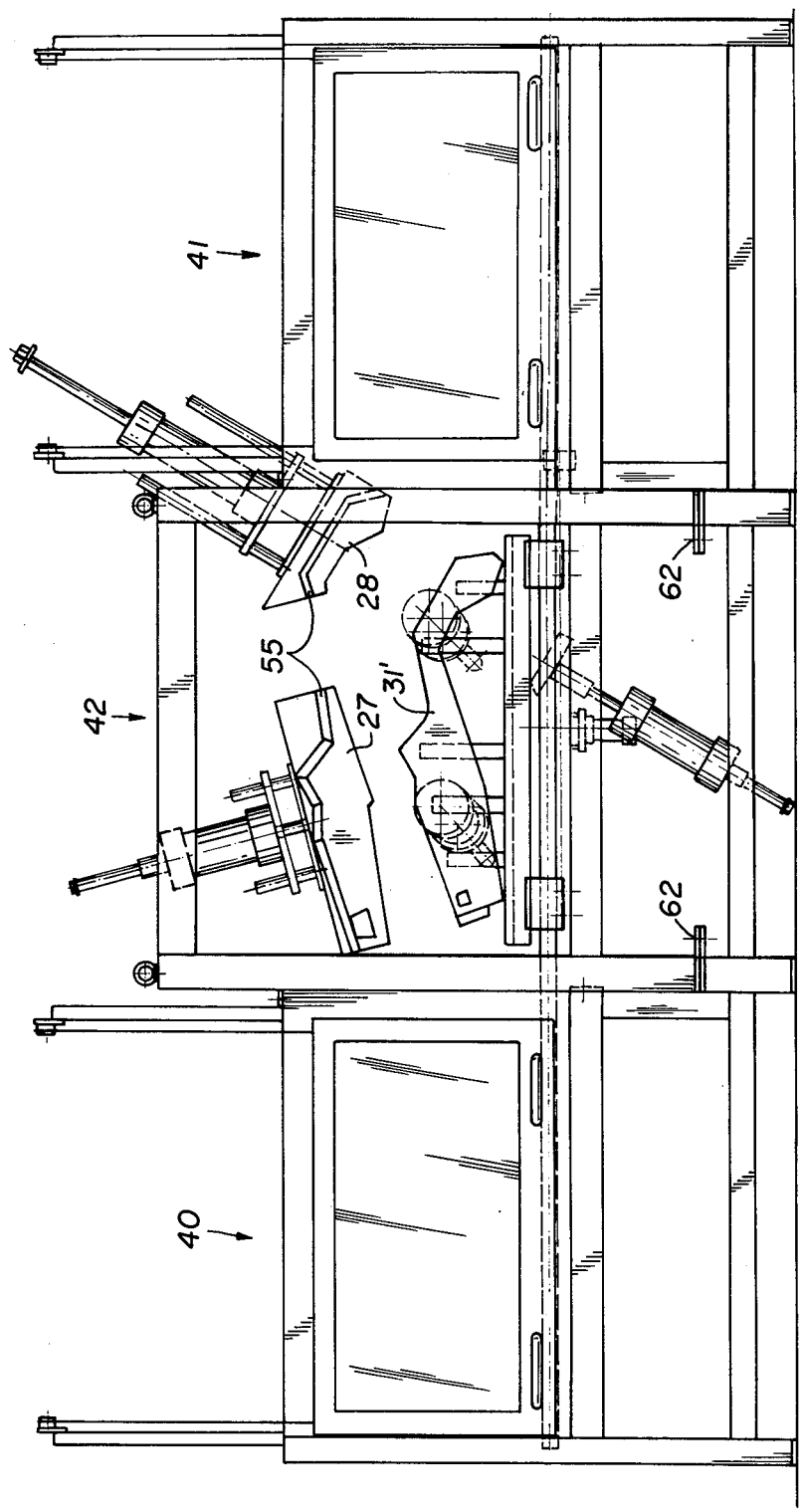
FIG. 6 is a front elevational view similar to that of FIG. 1 but showing an embodiment of the invention with a trimming station located between the two loading and unloading stations and with two support carriages.

In all figures the same elements are indicated by the same reference numbers. FIGS. 1, 2, and 3 illustrate an embodiment of the invention, wherein a trimming apparatus 1 comprises a base frame structure 2 supporting a trimming station 3 and a further base frame structure 59 supporting a loading and unloading station 4. The trimming station 3 includes upright frame members 61 removably secured to the base frame 2 by screw connections 62 and rigidly interconnected with each other by cross bar means 63. The loading station 4 and its frame structure 59 is secured to the base frame 2 of the trimming station 3. Further, for the protection of the operator, the loading and unloading station 4 comprises door means 5 which in the shown example are sliding doors 5 movable up and down along the guide rails 9 secured to the frame members 59. The doors 5 are, for example, suspended by cables 6 running over rollers 7 secured to the upper ends of the guide rails 9. The cables 6 are counter-weighted by conventional means not shown. An operator may raise and lower the doors 5 by the handles 8.

The trimming station 3 with its frame members 61 comprises tool carrier means 10 and 10'. The tool carrier means 10 support counter-holder means including respective power drive means to be described in more detail below. The tool carrier means 10' support the trimming tools proper and their respective power drive means also to be described in more detail below.

Referring to the counter-holder means 27 supported in the upper left hand corner of the frame members 61, a piston cylinder arrangement 11 is adjustably secured to the frame structure for example, by several adjustable clamping means 21' only one of which is shown in FIG. 1. These adjustable clamping means 21' may be secured in different angular positions to the frame structure, for example, by clamping jaws or the like elements well known in the art.

In the illustration of FIG. 1 the clamping jaws hold on to a guide plate 21 secured to the cylinder of the piston cylinder arrangement 11. However, the clamping jaws may also grip elements of the frame structure for adjusting the position of the guide and support plate 21 and thus of the piston cylinder arrangement 11 which in turn then defines the axial direction of movement of its piston rod 16, the lower end of which is secured by respective plate means to the counter-holder body 27. Guide pins 22 and 23 are rigidly secured to the counter-holder body 27 and are movable in respective apertures of the guide plate 21. Thus, if the piston rod 16 moves axially back and forth, the counter-holder body 27 will be properly guided by the guide pins 22, 23 moving in the apertures of the guide plate 21, whereby a parallel guide is formed.

Due to the adjustability of the clamping means or bracket 21', it is possible to select the angular position of the longitudinal axis of the piston rod 16 relative to the vertical and/or horizontal. For example, the bracket 21' may pivot about a journal pin 90 and be fixed in different angular positions by a set screw 91.

The length of the stroke of the piston rod 16 is adjustable because the upper end of the piston rod 16 extends out of the cylinder housing and is provided wth a threaded end to which there is attached an adjustment nut 17. A spacer sleeve 16' having a predetermined length is located between the adjustment nut 17 and the upper end of the cylinder 11 so that the piston rod 16 may move only to an extent determined by the position of the adjustment nut 17 and the length of the sleeve 16'.

The structure of the counter-holdr means 28 shown near the upper right hand corner of the trimming station 3 is substantially the same as that of the counter-holder means 27, except that the shape of the counter-holder body proper differs from that of the counter-holder body 27, depending on the particular shape of workpiece 20, as shown in FIGS. 4 and 5 for example. Further, the location of the knife edge protector inserts 55 in the counter-holder body 28 also differs, for example, from the shape of the same insert 55 in the body 27.

The guide pins 24, 25 provide again a parallel guide together with the guide plate 26 for the counter-holder body 28 as the latter is moved axially by the piston rod 15, the stroke of which is also adjustable by means of a nut 18 at the upper threaded end of the piston rod 15 and by means of a spacer sleeve 15' of predetermined length. The piston cylinder arrangement 12 of the counter-holder means 28 is also adjustably secured to the frame means 61, for example, by clamping means 64 adjustably secured to the frame means 61 in a conventional manner.

At the lower end of the trimming station 3, there is arranged a further tool support means 10' having a piston cylinder arrangement 13 with a piston rod 14 carrying at its working end a strip steel knife holder 29 having secured thereto strip steel knives 30, the details of which will be described below with reference to FIG. 8. The length of the stroke of the piston rod 14 is also adjustable by a nut 19 secured to the threaded outer end of the piston rod 14 and by a spacer sleeve or bushing 14' in the same manner as described above. Furthermore, the piston cylinder arrangement 13 is also secured to the frame structure in an adjustable manner so that the angular position of the longitudinal axis of the piston rod 14 relative to the horizontal and vertical may be determined when the apparatus with its tools is set for any particular trimming operation. The clamping means for adjustably and removably securing the piston cylinder arrangement 13 to the frame structure are not shown in detail in FIG. 1 because they are conventional and may be the same as described above for the counter-holder means 27. However, brackets 21" may also be secured to the cylinder 13 and to the frame at different elevational points relative to each other to thereby determine the angular position of the piston rod 14.

The base frame 2 further comprises cross beam means 65 which support guide rods 33 extending all the way into the loading and unloading station 4 where the guide rods may also be supported by the frame members 59. A workpiece supporting carriage 32 is slidable back and forth along the guide rods 33 as indicated by the double arrows 35. For this purpose the carriage 32 has slide bearings 34 which support the carriage 32 proper on the guide rods 33. The carriage 32 holds a workpiece receiving holding mold 31' secured to the carriage 32 proper by legs 31. A workpiece 20, such as a gearbox cover of a motor vehicle may be inserted into the workpiece receiving mold 31' as is shown in more detail in FIGS. 4 and 5 to be described below.

Power operated piston cylinder means 37 are secured to the frame means. The respective piston rod is movable upwardly to engage a centering hole in the carriage 32 for centering the carriage in its trimming position in the trimming station 3. Withdrawal of the piston rod from the carriage 32 releases the latter for travel into the station 4.

The top plan view of FIG. 2 illustrates the position of the various apparatus components of the trimming station 3 and of the loading and unloading station 4 relative to each other and relative to the frame structure. As viewed in the direction of the arrow A in FIG. 1, the position adjustable tool support and drive means 38, 39 are arranged on the left hand side of the trimming station 3. Similarly constructed and adjustably secured tool support and drive means 38' and 39' are arranged on the right hand side of the trimming station 3. The counter-holder and counter-holder drive means 11 and 12 are only illustrated schematically in the center of the trimming station 3.

The entire removable frame means 61 may be lifted off the base frame 2 after releasing the screw connections 62 which also center the frame means. Eyelets 58 are secured to the upper end of the frame means 61 and a crane or the like, not shown, may be used to lift the removable frame means or section 61 off the trimming station 3 for replacement by another frame structure carrying, for example, a different set of tools. The screw connections assure that different frame sections will fit onto the base frame in the proper positions, centered in the trimming station 3.

FIG. 2 also shows that the tool carriers and drive means 38, 39, 38', and 39' may have different angular positions relative to the vertical longitudinal center plane of the apparatus so that the respective tool supports 29 proper may have different positions for presenting their strip steel knives 30 to the workpiece 20 shown in FIG. 4. The longitudinal axis of the piston rods of the tool drive means 38, 39, 38', and 39' may also be varied or adjusted in their angular position relative to the horizontal. Such adjustment is accomplished by the above described clamping means which hold the respective tool support and drive means in adjustable positions in the frame structure.

The carriage 32 of the workpiece support means 31, 31' is driven by drive means 36, such as a pneumatic piston cylinder arrangement or a spindle driven by an electric motor. Independently of the type of drive means for the carriage 32, the latter will slide back and forth with its bearings 34 on the guide rails 33.

FIG. 3 also shows that the carriage 32 comprises a central hole 67 so that the tool support 29 with its strip steel knives 30 may pass through the carriage proper.

Referring to FIGS. 4 and 5 in conjunction with FIG. 3, the workpiece holding mold 31' with its legs 31 is secured to a base member 68 which is releasably attached to the workpiece support carriage 32, for example, by nuts and bolts not shown. As seen in FIG. 4 the workpiece 20 has cut-outs 43 and the workpiece supporting mold 31' is provided with cut-outs 43' through which the respective trimming knives may pass for trimming around the edges of the openings 43 in the workpiece 20.

Uneven margins 69 protrude over the edges of the workpiece 20 and it is the purpose of the present invention to trim these uneven margins 69 in one single operation. These margins 69 are the result of coating or cladding, for example, a dashboard which has been produced by die stamping or injection molding, with a plastic sheet material. Heretofore, such uneven margins 69 had to be removed either by hand or in several sequential work operations. This has been eliminated by the invention, thereby achieving substantial economic advantages.

By making the base plate 68 for the legs 31 removable from the carriage 32, the advantage is achieved, that differently shaped workpiece support molds may be secured to the carriage 32 for trimming differently shaped workpieces.

FIGS. 6 and 7 illustrate respectively a front view and a top view of a modified embodiment according to the invention, comprising a trimming station 42 arranged between two loading and unloading stations 40 and 41. The details of these stations are the same as those described above with regard to the first embodiment illustrated in FIGS. 1 – 5. Therefore, a detailed description of FIGS. 6 and 7 is not necessary. However, in operation the embodiment of FIGS. 6 and 7 will comprise two carriages so that one carriage may always be in the trimming station 42, whereas the other carriage is either loaded or unloaded in one of the respective stations 40, 41. In both embodiments of the invention it is advantageous, that the operator does not have to have his hands at any time inside the trimming station.

FIGS. 8 and 9 illustrate strip steel knife means that may be used in an apparatus according to the invention. The knife holder 70 which is also shown, for example, in FIG. 1 somewhat schematically at 29, carries a first strip steel knife 71 having a serrated edge 72. A further strip steel knife member 73 having a straight edge 74 is also secured to the knife holder 70 by means not shown in detail since they are conventional. For example, the knife member 73 may be held to the holder 70 in the same manner as the knife member 71, namely, by a plate 75 secured to the holder 70 by means of nuts and bolts 76. A first electric heater 77 is secured by means of clamping elements 78 to contact the knife member 71. A second electrical conductor 79 is secured to the holder 70 by clamping means 80. The heating of this type of cutting knives is known as such. The temperature to which the knives will be heated, will depend on the type of material to be cut. 140° C have been found to be suitable for most purposes where the trimming of plastic materials is involved.

The top edge 74 of the knife members 73 may, for example, be located slightly recessed relative to the edge defined by the teeth to accommodate particular shapes of workpieces and so as not to cut deeper than is necessary for the trimming operation.

FIG. 9 shows a knife member similar to the serrated knife member of FIG. 8 in combination with an insert 55 also shown schematically in FIG. 1. The insert 55 comprises a base 81 in which is inserted or to which is secured a knife edge protecting element 82 which may, for example, be made of teflon (RTM). Knife edge protecting element 82 may, however, be made of any suitable material which is sufficiently heat resistant and which will provide the necessary counter-holding strength without yielding too much when the knife teeth 72 penetrate through the material 83 to be trimmed, as shown at 84 in FIG. 9. Incidentally, the insert 82 may, for example, also be made of a silicone rubber which is relatively non-sensitive to heat exposure.

The operation of the present apparatus has been substantially described in the above text. However, it will be appreciated, that conventional timing and pressure control means will be part of the present apparatus. Thus, it is possible to select the pressure with which the knives 30 are applied and also the duration of the pressure application in accordance with the particular material to be trimmed. Similarly, the heat application may be accommodated to the material type which must be trimmed. Another control will provide a sequential operation of certain knife carrying piston cylinders so that they will not interfere with each other as they penetrate through the workpiece support 31' and through the carriage 32. A control of the counter-holder means may also be provided especially with regard to the pressure with which the counter-holder means are applied to the inside of the workpiece 20.

The tool holding mold 31' may, for example, be made of an epoxy resin and this applies also the the bodies 27, 28 of the counter-holder means.

Although the invention has been described with reference to specific example embodiments, it will be appreciated, that it is intended to cover all modifications and equivalents within the scope of the appended claims.

What is claimed is:

1. An apparatus for trimming randomly, three-dimensionally shaped workpieces having an inside and an outside, comprising frame means, workpiece support means mounted in said frame means for holding said workpiece on the outside of the workpiece, counter-holder means mounted in said frame means for contacting the workpiece on the inside and for holding a three-diimensional workpiece against said workpiece support means, tool carrier means mounted in said frame means, strip steel knife means operatively secured to said tool carrier means, power drive means operatively connected to said tool carrier means for moving said strip steel knife means toward and away from said workpiece, said strip steel knife means having a configuration corresponding to workpiece edges to be trimmed, said apparatus further comprising mounting means for securing said tool carrier means to said frame means in different angular positions, whereby said strip steel knife means which are secured to said tool carrier means, are movable in a direction determined by the angular position of the respective tool carrier means, said workpiece support means having openings therein for the strip steel knife means to pass through said openings whereby, the combination of all individual knife movements provides a three-dimensional cutting.

2. The apparatus of claim 1, further comprising centering means (37) for centering said workpiece support means in the trimming position.

3. The apparatus of claim 1, wherein said power drive means for said strip steel knife means comprise piston cylinder means including piston rods and piston rod guide means operatively connected to said piston cylinder means and to the respective tool carrier means, whereby a parallel guide is provided for the respective piston rod for positively determining the direction of tool movement.

4. The apparatus of claim 1, wherein said power drive means for said strip steel knife means comprise piston cylinder means, said apparatus further comprising adjustment means operatively connected to said piston cylinder means for adjusting the length of the piston stroke.

5. The apparatus of claim 1, wherein said mounting means for said tool carrier means comprise position adjustable means, said power drive means comprising piston cylinder means, said position adjustable mounting means securing said piston cylinder means to said frame means so that the direction of the piston stroke is adjustable relative to a workpiece.

6. The apparatus of claim 1, wherein said strip steel knife means have a serrated edge.

7. The apparatus of claim 1, wherein said strip steel knife means have a straight edge.

8. The apparatus of claim 1, wherein said strip steel knife means comprise configuragions adapted to said trimming, said configurations including serrated knife edge means and straight knife edge means.

9. The apparatus of claim 1, wherein said workpiece support means comprise carriage means, three-dimensional workpiece holding means on said carriage means for holding said three-dimensional workpiece, guide rod means secured in said frame means, said carriage means being movable on said guide rod means, trimming station means in said frame means, workpiece loading and unloading station means in said frame means, said guide rail means extending out of said trimming station means into said loading and unloading station means, whereby said carriage means with the workpiece holding means thereon are reciprocable between said trimming station means and said loading and unloading station means.

10. The apparatus of claim 1, wherein said workpiece support means comprise carriage means, three-dimensional workpiece holding means on said carriage means, trimming station means, first and second loading and unloading station means, said trimming station means being arranged intermediate said first and second loading and unloading station means, guide rod means secured in said frame means, said carriage means being movable on said guide rod means, said guide rail means extending through the first and second loading and unloading station means and through said trimming station means, whereby said carriage means with the workpiece holding means thereon are reciprocable between said trimming station means and said first and second loading and unloading station means such that one carriage means may be readied for trimming while another carriage means presents a workpiece for trimming and vice versa.

11. The apparatus of claim 1, further comprising heating means operatively connected to said strip steel knife means.

12. The apparatus of claim 1, wherein said power drive means for said strip steel knife means are pneumatic cylinder piston means.

13. The apparatus of claim 1, further comprising position adjustable mounting means for said counter-holder means whereby the angular position of said counter-holder means is adjustable in said frame means.

14. The apparatus of claim 1, wherein said counter-holder means comprise cylinder means, and means for adjusting the piston stroke thereof.

15. The apparatus of claim 1, wherein said counter-holder means comprise inserts for reducing the wear and tear on said strip steel knife means.

16. The apparatus of claim 15, wherein said inserts are of heat resistant material.

17. The apparatus of claim 1, wherein said frame means comprise a removable frame section, means mounting said counter-holder means in said removable frame section, whereby a set of counter-holder means may be replaced by removing said removable frame section and inserting another frame section carrying different counter-holder means.

18. The apparatus of claim 17, wherein said frame means comprise a base frame, and means removably securing said removable frame section to said base frame means, as well as centering means on said removable frame section and on said base frame, whereby any removable frame section may be properly centered with regard to the base frame.

19. The apparatus of claim 1, wherein said tool carrier means comprise releasable mounting means for replacing one set of tools for another set of tools.

20. The apparatus of claim 1, further comprising protective door means arranged for closing a space within said frame means.

21. The apparatus of claim 1, comprising further power drive means operatively connected to said counter-holder means for moving the counter-holder means into an operative, workpiece counter-holding position relative to said workpiece support means which hold the workpiece on the outside of the workpiece, said counter-holder means holding the workpiece substantially on the inside of the workpiece.

22. The apparatus of claim 21, wherein said further power drive means for said counter-holder means comprise pneumatic piston cylinder means.

* * * * *